Dec. 7, 1965  J. F. GILLEENY  3,222,027
VALVE WITH MEANS FOR PREVENTING ACCIDENTAL DISASSEMBLY
Filed Dec. 12, 1962
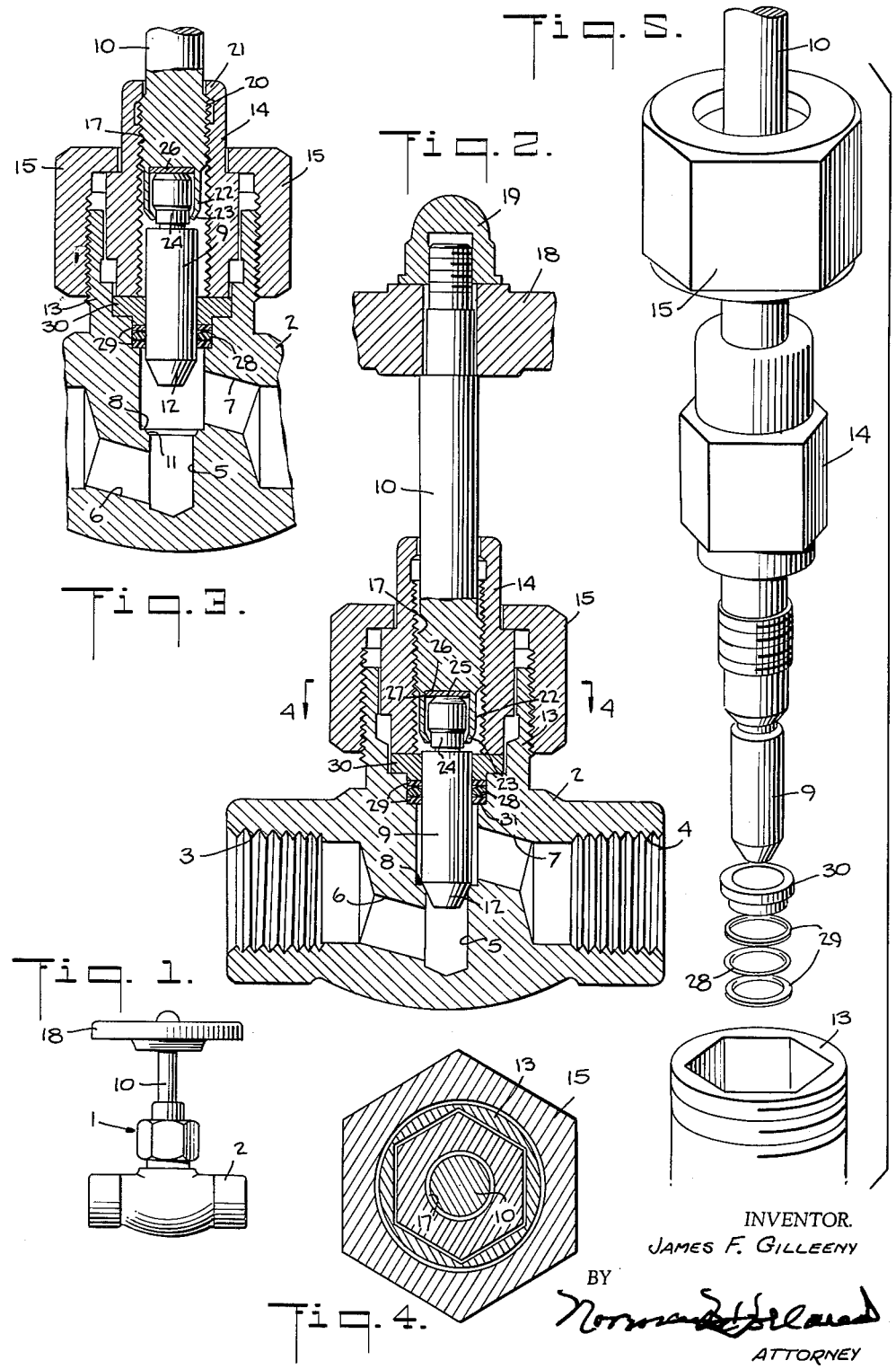
INVENTOR.
JAMES F. GILLEENY
BY
ATTORNEY

United States Patent Office 3,222,027
Patented Dec. 7, 1965

3,222,027
VALVE WITH MEANS FOR PREVENTING
ACCIDENTAL DISASSEMBLY
James F. Gilleeny, Waldwick, N.J., assignor to Hoke Incorporated, Cresskill, N.J., a corporation of New York
Filed Dec. 12, 1962, Ser. No. 244,121
2 Claims. (Cl. 251—264)

The present invention relates to an improved valve and more particularly to an improved valve of the type generally known as a union bonnet valve.

In order to provide for ready assembly and for access to the valve stem and to the valve packing, it is conventional to have valve bonnet structures threadedly connected. In valves of the union bonnet type such threaded construction, while desirable from an assembly and maintenance point of view, has also presented the possibility of accidental disassembly of the valve. Excess turning of the valve stem during its opening has caused the stem guide to loosen the valve packing nut so that the valve stem is turned out of the bonnet. This permits the escape of the controlled fluid from the valve thereby subjecting the valve operator to possible injury due to the explosive forces accompanying such leakage in high pressure systems and the possible harmful effects of the released fluid itself.

The improved valve structure of this invention prevents such accidental disassembly of the valve while retaining the desirable features of the union bonnet type of valve. In addition, the valve of the present invention has an improved stem packing which cooperates with the novel safety structure and which also isolates the bonnet structure from the controlled fluid. This separates the safety bonnet structure from the controlled fluid thereby avoiding any corrosive effects on the bonnet structure from the controlled fluid and also permits the stem threads to be lubricated as desirable while keeping the lubricating fluid separated from the controlled fluid passing through the valve.

Accordingly, an object of the present invention is to provide an improved valve embodying novel safety features.

Another object of the present invention is to provide an improved union bonnet valve;

Another object of the present invention is to provide an improved stem packing for a valve.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, or a part of the specification, wherein:

FIG. 1 is a side elevational view of the valve in accordance with the present invention;

FIG. 2 is an enlarged vertical sectional view of the valve of FIG. 1;

FIG. 3 is a fragmentary vertical sectional view illustrating the stem in its open position;

FIG. 4 is a horizontal sectional view taken along line 4—4 of FIG. 2; and

FIG. 5 is an enlarged exploded perspective view of the bonnet stem assembly.

As best illustrated in FIGS. 1 and 2, the valve 1 of the present invention includes a body 2 having a threaded inlet 3 and an outlet 4 interconnected through a cavity 5 by passages 6 and 7. A valve seat 8 is formed in the side walls of the cavity 5 adapted to receive the tapered valve point 9 rotatably mounted on a valve stem 10. Generally complementarily tapered surfaces 11 and 12 (FIG. 3) are provided on a seat 8 and the point 9 respectively. The bonnet portion of the valve body 2 comprises a projecting bonnet flange 13 which accommodates and supports a valve stem guide 14. The valve stem guide 14 is locked into position within the bonnet flange 13 by a packing nut 15 threadedly connected to the bonnet flange 13. The valve stem 10 is adjustably mounted in the threaded hollow center 17 of the valve stem guide 14 and rotation of the valve stem 10 moves the valve point 9 into and out of engagement with the valve seat 8. A suitable handle 18 is attached to the top of the stem 10 by means of a lock nut 19.

When the valve stem 10 has been turned to its fully open position as illustrated in FIG. 3, the uppermost threads 20 of the valve stem 10 strike the restricted terminal portion 21 of the hollow center 17 of the valve stem guide 14. When thus engaged, this contact tends to transfer the opening torque from the valve stem 10 to the valve stem guide 14. In order to prevent a corresponding rotation of the valve stem guide 14 and of the packing nut 15 which would disassemble the bonnet structure, the interior side walls of the bonnet flange 13 and the outer surfaces of the valve stem guide 14 are formed with a non-circular shape such as the complementary hexagonal shapes illustrated in FIG. 4 which is a horizontal section taken through this portion of the valve bonnet structure. Such angularly oriented faces are easily formed on both the outer surface of the stem guide 14 and on the inner surface of bonnet flange 13. It is clear that this structure or another keying means provided between the guide 14 and the bonnet flange 13 will prevent rotation of the valve stem guide 14 irrespective of the amount of torque applied to the valve stem guide 14 from the valve stem 10. The unintentional disassembly of the valve with its attendant danger and loss is thus prevented while assembly and intentional disassembly are facilitated. FIGS. 2 and 3 illustrate a preferred embodiment of the valve point 9 which cooperates with the described bonnet structure and the hereinafter described packing to provide improved sealing and longer valve life. As seen in these figures, the valve point 9 has its upper portion loosely accommodated within a hollow tip 22 of the valve stem 10. A constricted end portion 23 of the hollow stem tip 22 enters a cooperating groove 24 on the valve point 9 to loosely hold the valve point 9 in position on the stem 10 and to raise the point 9 towards its open position when the valve is opened. Downward force to close the valve by moving the point 9 into engagement with the valve seat 8 is provided between the upper surface 25 of the valve point 9 and the interior surface 26 of the hollow tip 22 of the valve stem 10.

In the preferred embodiment, a hard metal bearing disc 27 is inserted between surfaces 25 and 26. This bearing disc 27 provides for a relatively low coefficient of friction between the valve stem 10 and the valve point 9 so that the valve point 9 is moved downwardly to its fully sealed position with a minimum amount of rotation of the valve point 9 on the valve seat. After the valve point 9 initially engages the valve seat 8, the bearing permits relative rotation between the valve stem 10 and the valve point 9 resulting from the greater friction force present between the valve seat 8 and the valve point 9 than between the top 25 of the valve point and the bearing disc 27. This permits the valve to be tightly closed with minimum valve point wear and substantially lengthens the life of the valve point 9.

In the preferred embodiment, the valve stem packing is provided between the valve body 2 and the valve point 9. This positions the valve stem packing close to the valve seat 8 so that the controlled fluid does not pass beyond the valve point 9 and thus remains out of contact with the valve bonnet structure and the threads on the valve stem 10. This prevents any contamination or corrosion of the bonnet structure from the controlled fluid and also permits the valve stem threads to be lubricated as desired since there is no contact between the lubricated portion of the valve stem 10 and the controlled fluid. The preferred embodiment of this packing as illustrated in FIG. 2 comprises a packing washer such as O-ring 28 or another resilient annular member compressed between packing shims 29. The shims 29 are slidably fitted about the valve point 9 and are gripped between a retaining washer 30 and a flange 31 on the valve body 2 to force the O-ring 28 into engagement with the valve point 9 and the valve body 2. The packing nut 15 applies this compressive force through the intermediation of the valve stem guide 14.

It will be seen that an improved valve has been disclosed with a novel bonnet structure which is easily assembled but which cannot be unintentionally disassembled and which has a cooperating valve point and stem packing to facilitate assembly and disassembly while which effectively isolating the improved bonnet structure from the controlled fluid. The valve point and stem packing also provide an extended valve life. These features are provided in a relatively simple valve structure with a minimum number of parts capable of being manufactured by standard machine tools. The novel features cooperate to give a relatively simple, safe, long lived and easily manipulated valve. The above improvements are obtained in a structure which can be readily disassembled when necessary for an inspection of the stem and sealing elements.

Having thus described by invention, I claim:

1. In a valve the combination of a valve body having spaced inlet and outlet ports and a seat, an integral outwardly extending hollow flange on said body, the hollow flange having both an internal polygonal surface and an external threaded surface, a valve stem guide mounted in said hollow flange and having an external polygonal surface for registry with the internal surface of the hollow flange, said guide having a threaded aperture therethrough and a restricted terminal portion around one end and concentric with the aperture, a valve stem aligned with said seat and having a point at one end for engaging the valve seat and having a threaded portion intermediate its ends for engagement with threaded aperture of the guide, a retainer threadedly mounted on said hollow flange for normally engaging and restraining the stem guide against movement along the valve stem whereby rotation of the valve stem within said threaded aperture moves the valve point toward or away from the valve seat, and said restricted terminal portion and the polygonal surfaces on the guide and the hollow flange cooperating to prevent rotation of the valve stem and the retainer when the stem threads abut the restricted terminal portion of the guide.

2. In a valve the combination defined in claim 1 which further comprises a packing zone in the valve body surrounding the valve stem point, packing material in said zone adapted to slidably engage the valve stem point, a washer superimposed on the packing material, the washer being in abutting relationship with the stem guide whereby the packing material is compressed by turning said threaded retainer on said hollow flange.

References Cited by the Examiner

UNITED STATES PATENTS

| 1,003,488 | 9/1911 | Moen | 251—221 X |
| 1,698,439 | 1/1929 | Johnson | 251—214 |
| 1,738,250 | 12/1929 | Judell et al. | 251—266 |
| 2,646,959 | 7/1953 | Carver | 277—112 XR |
| 2,903,310 | 9/1959 | Hill | 277—188 XR |
| 2,994,343 | 8/1961 | Banks | 251—223 XR |
| 3,101,190 | 8/1963 | Lindgren | 251—221 |

FOREIGN PATENTS

| 698,713 | 10/1953 | Great Britain. |
| 892,907 | 5/1944 | France. |

ISADOR WEIL, *Primary Examiner.*